US010962343B2

(12) United States Patent
Rudkowski et al.

(10) Patent No.: US 10,962,343 B2
(45) Date of Patent: Mar. 30, 2021

(54) ROCKER-FREE MEASURING SYSTEM FOR A MEASURING INSTRUMENT

(71) Applicant: Carl Mahr Holding GmbH, Goettingen (DE)

(72) Inventors: Matthias Rudkowski, Rhumspringe (DE); Andreas Lange, Gleichen-Reinhausen (DE)

(73) Assignee: Carl Mahr Holding GmbH, Goettingen (DE)

( * ) Notice: Subject to any disclaimer, the term of this patent is extended or adjusted under 35 U.S.C. 154(b) by 288 days.

(21) Appl. No.: 16/013,632

(22) Filed: Jun. 20, 2018

(65) Prior Publication Data
US 2018/0372470 A1 Dec. 27, 2018

(30) Foreign Application Priority Data
Jun. 21, 2017 (DE) .......................... 102017113695.9

(51) Int. Cl.
*G01B 5/008* (2006.01)
*G01B 5/28* (2006.01)
(Continued)

(52) U.S. Cl.
CPC ............. *G01B 5/008* (2013.01); *G01B 3/008* (2013.01); *G01B 5/28* (2013.01); *G01B 7/001* (2013.01)

(58) Field of Classification Search
CPC .......... G01B 5/28; G01B 3/008; G01B 7/001; G01B 21/047; G01B 5/0009; G01B 5/008; G01B 7/016; G01B 7/34; G01B 5/0004
(Continued)

(56) References Cited
U.S. PATENT DOCUMENTS 4,888,877 A     12/1989   Enderle et al.
4,961,267 A  *  10/1990   Herzog .................. G01B 5/008
                                                     33/1 M
(Continued)

FOREIGN PATENT DOCUMENTS

CN     1694786 A     11/2005
CN     1882821 A     12/2006
(Continued)

OTHER PUBLICATIONS

Chinese Office Action dated Feb. 3, 2020, in corresponding Chinese Application No. 201810635559.X, with English translation (18 pages).
(Continued)

*Primary Examiner* — Yaritza Guadalupe-McCall
(74) *Attorney, Agent, or Firm* — Fitch, Even, Tabin & Flannery LLP

(57) ABSTRACT

A measuring system (15) includes a measuring arm receiving unit (18) mounted on the housing (49) or on an axial pin (30) connected to the housing (49) for conjoint rotation so as to be rotatable or pivotable about the axis of rotation (D). A measuring arm (16) can be arranged on the measuring arm receiving unit (18). A motor unit (24) generates a motor torque about the axis of rotation (D) on the measuring arm receiving unit (18). A rotary angle specifying the rotary angle position of the measuring arm receiving unit (18) about the axis of rotation (D) is detected by a measuring device (67) having a scale part (68) and a detection unit (69). The scale part (68) is arranged in the form of a circular arc, annularly, or in the form of a disc about or coaxially with the axis of rotation (D).

20 Claims, 10 Drawing Sheets

(51) Int. Cl.
*G01B 3/00* (2006.01)
*G01B 7/00* (2006.01)

(58) Field of Classification Search
USPC .......................................................... 33/503
See application file for complete search history.

(56) References Cited

U.S. PATENT DOCUMENTS

| | | | |
|---|---|---|---|
| 5,146,690 A | | 9/1992 | Breitmeier |
| 5,189,806 A | | 3/1993 | McMurtry |
| 5,396,712 A | * | 3/1995 | Herzog ................... G01B 5/008 33/502 |
| 5,621,978 A | * | 4/1997 | Sarauer .................. G01B 5/008 33/1 M |
| 5,867,916 A | * | 2/1999 | Matzkovits .......... G01B 21/047 33/503 |
| 6,209,217 B1 | * | 4/2001 | Tsuruta .................... G01B 5/20 33/551 |
| 6,300,704 B1 | | 10/2001 | Maldener et al. |
| 6,354,012 B1 | * | 3/2002 | Pettersson .............. G01B 7/008 33/503 |
| 6,546,643 B2 | * | 4/2003 | Lotze ................... G01B 21/045 33/503 |
| 6,854,193 B2 | * | 2/2005 | Lotze ................... G01B 11/005 33/502 |
| 7,036,238 B2 | * | 5/2006 | Kojima ................... G01B 5/08 33/503 |
| 7,073,271 B2 | | 7/2006 | Raab et al. |
| 7,142,999 B2 | * | 11/2006 | Grupp .................. G01B 11/005 702/95 |
| 7,294,948 B2 | | 11/2007 | Wasson et al. |
| 8,006,398 B2 | * | 8/2011 | McFarland .......... G05B 19/401 33/503 |
| 8,701,301 B2 | | 4/2014 | Nakayama et al. |
| 9,377,284 B2 | | 6/2016 | McMurtry et al. |
| 9,568,074 B2 | | 2/2017 | Gosselin |
| 10,031,311 B2 | * | 7/2018 | Lotz ........................ G01B 11/27 |
| 2001/0025427 A1 | * | 10/2001 | Lotze ................... G01B 21/045 33/559 |
| 2002/0170196 A1 | * | 11/2002 | Takemura ................ G01B 7/34 33/551 |
| 2002/0189117 A1 | * | 12/2002 | Gotz ....................... G01B 5/008 33/503 |
| 2003/0037451 A1 | * | 2/2003 | Sarauer .................. G01B 5/008 33/608 |
| 2003/0233760 A1 | * | 12/2003 | Lotze ................... G01B 21/042 33/502 |
| 2007/0051179 A1 | | 3/2007 | McMurtry et al. |
| 2012/0096728 A1 | | 4/2012 | Reitemeyer |
| 2014/0292136 A1 | | 10/2014 | Okai et al. |
| 2014/0326057 A1 | | 11/2014 | Nakayama |
| 2014/0332308 A1 | | 11/2014 | Kirschbaum et al. |
| 2015/0292851 A1 | | 10/2015 | Yamamoto et al. |
| 2017/0059297 A1 | | 3/2017 | Ooyama et al. |
| 2018/0272490 A1 | * | 9/2018 | Brenner ................ B23Q 17/003 |
| 2018/0372470 A1 | * | 12/2018 | Rudkowski ............ G01B 5/008 |
| 2019/0003819 A1 | * | 1/2019 | Rudkowski ............ G01B 7/001 |
| 2020/0124393 A1 | * | 4/2020 | Rudkowski .......... G01B 5/0004 |
| 2020/0132429 A1 | * | 4/2020 | Nakayama ............... G01B 5/28 |

FOREIGN PATENT DOCUMENTS

| | | |
|---|---|---|
| CN | 101156043 A | 4/2008 |
| CN | 101438486 A | 5/2009 |
| CN | 101852582 A | 10/2010 |
| CN | 102749058 A | 10/2012 |
| CN | 102768028 A | 11/2012 |
| CN | 102859316 A | 1/2013 |
| CN | 103882892 A | 6/2014 |
| CN | 104410195 A | 3/2015 |
| CN | 205497222 U | 8/2016 |
| CN | 106482604 A | 3/2017 |
| DE | 3152731 A1 | 7/1983 |
| DE | 4013742 A1 | 10/1991 |
| DE | 4437033 A1 | 4/1996 |
| DE | 19521845 A1 | 12/1996 |
| DE | 19617022 C1 | 12/1997 |
| DE | 102005007002 A1 | 8/2006 |
| DE | 102007019833 A1 | 10/2008 |
| DE | 102009019129 A1 | 11/2010 |
| DE | 102009020294 A1 | 11/2010 |
| DE | 102007018444 C5 | 2/2011 |
| DE | 102012107211 A1 | 7/2013 |
| DE | 102014110801 A1 | 2/2016 |
| DE | 102015004525 A1 | 10/2016 |
| EP | 0583649 A1 | 2/1994 |
| EP | 0816014 A2 | 1/1998 |
| EP | 0961044 A2 | 12/1999 |
| EP | 1168575 A2 | 1/2002 |
| EP | 2384851 A1 | 11/2011 |
| EP | 2564152 A1 | 3/2013 |
| JP | S60224012 A | 11/1985 |
| JP | H03178537 A | 8/1991 |
| JP | 2585992 B2 | 2/1997 |
| NL | 8901010 A | 11/1990 |
| WO | 2014009192 A1 | 1/2014 |

OTHER PUBLICATIONS

Intellectual Property Office Combined Search and Examination Report dated Dec. 19, 2018, for Great Britain Patent Application No. 1810002.4 (6 pgs.).

The German Patent and Trademark Office, Office Action dated May 4, 2018, for German Patent Application No. 102017113695.9, with Machine English Translation (7 pgs.).

Chinese Office Action and Search Report dated Mar. 19, 2020, in related Chinese Application No. 201810635879.5, with machine English translation (14 pages).

Shuzhen Wang et al., Development and Application of a New Three-dimensional Profilometer, Lubrication Engineering, May 31, 2009, pp. 84-89, vol. 34 No. 5, with English translation of the Abstract (4 pages).

British Combined Search and Examination Report dated Dec. 19, 2018, in related British Application No. GB1810001.6 (5 pages).

German Office Action dated Feb. 22, 2018, in related German Application No. 102017113699.1, with machine English translation (6 pages).

British Office Action dated Aug. 24, 2020, in corresponding British Application No. GB1810002.4 (5 pages).

British Office Action dated Jan. 25, 2021, in corresponding British Application No. GB1810002A (6 pages).

* cited by examiner

Fig.7

ROCKER-FREE MEASURING SYSTEM FOR A MEASURING INSTRUMENT

RELATED APPLICATION(S)

This application claims the benefit of German Patent Application No. 10 2017 113 695.9, filed Jun. 21, 2017, the contents of which is incorporated herein by reference as if fully rewritten herein.

TECHNICAL FIELD

The invention relates to a measuring system for a measuring instrument.

BACKGROUND

A measuring system can comprise a measuring arm which is mounted pivotably about an axis of rotation and which has two arms protruding away from the axis of rotation in opposite directions, which arms thus form a rocker. A measuring element or probe element, for example a probe tip, a probe skid, or a probe ball, is arranged on a front arm of the rocker, whereas the other, rear end is assigned a sensor and a force-generating device. The deflection of the rear arm can be detected by means of the sensor, and on this basis a measurement value can be determined. The force-generating device is used to press the probe element with a defined force against the surface of an object or workpiece that is to be measured. A probe system of this kind is known for example from DE 40 13 742 A1, DE 31 52 731 A1, DE 196 17 022 C1, DE 10 2007 019 833 A1 or DE 10 2015 004 525 A1. Probe systems of this kind can be used for example when measuring the roughness of a surface of an object.

In a probe system of this kind the measuring force with which the probe element rests on the surface of the object can be adjusted. A measuring force adjustment is known for example from DE 40 13 742 A1 or DE 10 2009 020 294 A1.

With use of measuring or probe systems of this kind, for example in coordinate measuring instruments, the measuring system as a whole can be positioned or oriented in space by means of an appropriate device. Corresponding devices are described for example in DE 10 2009 019 129 A1 or DE 10 2014 110 801 A1.

Proceeding from the prior art, the object of the present invention can be considered that of creating a measuring system, the measuring direction of which can be easily adapted to the orientation of a surface of an object to be measured.

SUMMARY

The measuring system according to the invention can be embodied as a tactile probe system for contact-based measurement or can be embodied as a contactless measuring system. The measuring system can be used for example to measure a surface roughness, a geometry, or a dimensional deviation of an object. A rotary or pivot movement of a measuring arm is detected for the measurement. The rotary or pivot movement is in turn brought about by a measuring or probe element arranged on the object, which element is in contact with the surface of the object or is moved at a defined or known distance, without contact, along the surface of the object.

The measuring system comprises a stationary assembly, which in one exemplary embodiment comprises a non-rotatable axial pin extending along the axis of rotation. Further parts of the stationary assembly can be fastened to the axial pin, such as a housing. A measuring arm receiving unit is mounted on the stationary assembly in a manner rotatable about an axis of rotation. The measuring arm receiving unit is configured to receive a measuring arm with a measuring element arranged at the free end. The measuring arm receiving unit can provide an appropriate mechanical and/or electrical receiving interface for the measuring arm.

The measuring system additionally comprises a motor unit, which preferably comprises an electric motor and in particular a brushless electric motor. For example, it can be a brushless DC motor with permanent magnets. The motor unit has a rotor which is arranged coaxially with the axis of rotation and which is connected to the measuring arm receiving unit for conjoint rotation. By means of the motor unit, the measuring element provided on the measuring arm can be arranged in a rotary angle position about the axis of rotation or, in the case of a measuring probe system operating in a tactile manner, can be pressed against the surface of an object with a predefined measuring force.

The axis of rotation is oriented at right angles to the measuring plane. The measuring plane is the plane within which a measuring element arranged on the measuring arm is movable. The measuring plane preferably runs centrally through a measuring arm received on the measuring arm receiving unit.

The measuring system additionally has a measuring device with a scale part and a detection unit. The detection unit cooperates with the scale part in order to detect a rotary angle value. The rotary angle value describes the rotary angle position or pivot position of the measuring arm receiving unit or the measuring arm arranged thereon about the axis of rotation. Either the scale part or the detection unit is connected to the measuring arm receiving unit for conjoint rotation.

By means of a measuring system of this kind, a large rotary or pivot angle range of the measuring arm is possible for measurements. In principle, it is possible that the measuring arm can be rotated or pivoted about 360°. A rotary angle limitation, as exists in previous measuring systems comprising a rocker, no longer exists on account of the design. Both the motor unit and the measuring device work in a rotary manner coaxially with the axis of rotation.

As mentioned, the motor unit can be used to generate a torque about the axis of rotation in order to push a measuring element arranged on the measuring arm with a defined measuring force against a surface of an object to be measured, in particular independently of the orientation of the object surface in space. In order to control the measuring force, one or more characteristic curves can be stored. The characteristic curves can predefine a motor controlled variable, describing the measuring force or the torque of the motor unit, in a parameter-dependent manner, for example depending on the used measuring arm, in particular the length thereof between the axis of rotation in the measuring element, and/or depending on the current rotary position of the measuring arm receiving unit about the axis of rotation relative to the vertical or horizontal. The motor unit can be controlled depending on this characteristic curve in order to set the desired measuring force. For example, the motor current of an electric motor can be controlled by open-loop or closed-loop control in accordance with a characteristic curve of this kind. The at least one characteristic curve can be determined empirically by test measurements.

The scale part is preferably coaxial with the axis of rotation and is mounted rotatably about the axis of rotation and is connected to the measuring arm receiving unit for conjoint rotation, wherein this connection providing conjoint rotation can be provided indirectly or directly. For example, the scale part can be directly connected to the rotor and thus indirectly connected to the measuring arm receiving unit. The scale part can be a circular disc that is fully closed about the axis of rotation. If a rotary angle range for example of 180°, 90°, etc. should be sufficient, a corresponding scale part in the form of a circular arc that extends over the desired rotary angle range can be used instead of a disc that is closed in an annular manner about the axis of rotation.

The detection unit the measuring device preferably works together with the scale part in a contactless manner. For example, the rotary angle value can be detected inductively, optically, etc. The measuring device can be configured for relative or absolute detection of the rotary angle value.

It is preferred if the detection unit is arranged so as to be immovable relative to the stationary assembly. In a preferred exemplary embodiment the detection unit comprises a transmitter and a receiver. The transmitter transmits an electromagnetic radiation or waves, for example light, which is altered by the scale part arranged in the radiation path depending on the rotary movement or rotary position of the scale part relative to the detection unit and is then received by the receiver. Instead of the use of light, a magnetic field generated by the transmitter can also be varied by the scale parts, for example, and the varied magnetic fields can be detected by the receiver (inductive coupling).

The detection unit is in particular also configured to identify the direction of rotation or sense of rotation about the axis of rotation. For example, for direction of rotation identification, a plurality of scale ranges with scale elements shifted relative to one another about the axis of rotation can be provided on the scale part and/or receivers arranged offset from one another about the axis of rotation can be provided, which receivers can also each be associated with a separate or a common transmitter.

The transmitter and the receiver can be arranged on the same side or on opposite sides of the scale part. The transmitter and the receiver are preferably arranged on the same side of the scale part, and the scale part comprises radiation-reflecting and non-radiation-reflecting regions in alternation, which are arranged in alternation in the peripheral direction about the axis of rotation.

It is additionally preferred if the motor unit comprises a stator, which is part of the stationary assembly and can be fastened to the axial pin or to the housing for conjoint rotation. The stator can preferably surround the rotor coaxially. It is advantageous if the motor unit comprises a permanently excited electric motor, the magnets of which are arranged on the stator. The mass of the rotor and moment of inertia thereof can thus be reduced.

A plurality of rotor windings are preferably provided on the rotor and are electrically connected to at least one electrical winding terminal. The at least one winding terminal is arranged rotatably jointly with the rotor. In one exemplary embodiment, a plurality of winding terminals are provided, wherein a separate winding terminal is provided for each provided rotor winding and an additional common winding terminal is provided for all rotor windings. For example, four winding terminals can be provided for three windings, accordingly.

In one exemplary embodiment, it is additionally provided that at least one electrical measuring arm terminal is provided on the measuring arm receiving unit in order to be able to produce an electrical connection to a measuring arm held in the measuring arm receiving unit. At least two measuring arm terminals are preferably provided. For example, it is thus possible to read a data carrier, in particular a chip, which is arranged in the measuring arm, and therefore to identify the measuring arm type automatically. A further measuring arm terminal can be provided for example in order to detect whether or not a measuring arm is provided in the measuring arm receiving unit.

A terminal device comprising at least one electrical terminal is preferably provided on the stationary assembly, for example on the housing. In addition, an electrical connection device is provided which electrically connects the electrical terminal device to the at least one winding terminal and/or the at least one measuring arm terminal. The connection device is configured to establish this electrical connection in such a way that a relative rotation of the rotor or of the measuring arm receiving unit relative to the stationary assembly is possible about the axis of rotation in the desired rotary angle range, preferably about up to 360° or even in rotary angle ranges greater than 360°. In principle, it is possible to form the measuring system in such a way that the measuring arm receiving unit can be rotated about the axis of rotation relative to the housing once or more, or fully by 360°.

The connection device, in one exemplary embodiment, can provide an electrical connection via brush contacts, as is known for example in the case of electric motors or other rotary electrical connections. A contactless inductive coupling can also be used. Instead of the brushes, electrically conductive rolling elements, for example balls, and an associated rolling body track running in the peripheral direction in the rotary angle range can also establish an electrical connection enabling relative rotation.

In a preferred exemplary embodiment the electrical connection device comprises at least one spiral conductor, the spiral of which extends substantially in a radial plane radially to the axis of rotation. The radially outer end of the spiral conductor can be electrically connected to the terminal device on the housing, and the other, radially inner end can be electrically connected to an associated winding terminal or measuring arm terminal. In the event of rotation of the rotor or of the measuring arm receiving unit about the axis of rotation relative to the housing, the spiral conductor can be further wound or unwound spirally, depending on the sense of direction of the relative rotation. An electrical connection without abrasive or rolling contact is established by means of a spiral conductor of this kind.

The measuring system can additionally comprise a weight compensation device. The weight compensation device is configured to generate a compensation torque about the axis of rotation, which compensation torque is effective between the stationary assembly and the measuring arm receiving unit. A measuring arm received in the measuring arm receiving unit generates a torque about the axis of rotation on account of its weight force. This torque, induced by the weight force of the measuring arm, can be compensated for at least in part by the compensation torque of the weight compensation device. The torque generated by the weight force of the measuring arm about the axis of rotation is also dependent on the orientation of the measuring arm relative to the horizontal or vertical. A compensation torque is adjusted by means of the weight compensation device in such a way that an at least partial compensation is provided in a desired rotary angle range of the measuring arm and relieves the load on the motor unit to the greatest possible extent.

As a result of this relief, the motor unit only has to generate small torques. The compensation torque can also be set depending on the desired measuring force with which a measuring element on the measuring arm is to be placed against the surface of an object. This measuring force can thus be provided at least in part by the weight of the measuring arm.

The weight compensation device, in one exemplary embodiment, can comprise at least one spiral spring, the radially inner end of which is connected to the measuring arm receiving unit for conjoint rotation and the radially outer end of which is connected to the stationary assembly, for example to the housing. The spiral spring can in this way generate a compensation torque between the measuring arm receiving unit and the stationary assembly.

In a particularly preferred embodiment at least one of the provided spiral springs of the weight compensation device can form an electrical spiral conductor at the same time. To this end, the spiral spring can be produced from an electrically conductive material or at least can contain electrically conductive material. A spiral spring of this kind consequently has a dual function: on the one hand it can generate a compensation torque, and on the other hand it can provide an electrically conductive connection between the stationary assembly and the constituents rotatable relative thereto, such as the rotor or the measuring arm receiving unit.

It is additionally advantageous if the weight compensation device comprises a setting device. The value of the compensation torque can be set by means of the setting device. To this end, for example, one housing part, to which the radially outer end of the at least one spiral spring is fastened, can be rotated about the axis of rotation relative to another part, to which the radially inner end of the at least one spiral spring is fastened, and can be fixed in the desired rotary position.

The measuring arm receiving unit and/or the rotor can be mounted on the axial pin of the stationary assembly by means of a ball bearing guide sleeve. The axial pin and the ball bearing guide sleeve can be part of a ball bearing guide unit. The ball bearing guide sleeve or the ball bearing guide unit can provide both a rotatability of the measuring arm receiving unit or of the rotor about the axis of rotation and an axial displaceability of the measuring arm receiving unit or of the rotor along the axial pin axis of rotation or the axial pin. A very low-friction bearing can thus be achieved. This low-friction bearing can be improved furthermore in that a magnetic axial bearing device is provided, which is configured to define an axial position of the measuring arm receiving unit and/or of the rotor and/or of the ball bearing guide sleeve along the axial pin. To this end, magnetic forces acting in the axial direction for providing axial support can be generated. Ball bearing guide units of this kind are produced and offered as highly accurate bearing units for measuring devices (MarMotion high precision rotary stroke bearing, catalogue 3757245-01.01.2005 from Mahr GmbH).

BRIEF DESCRIPTION OF THE DRAWINGS

Advantageous embodiments of the measuring system will become clear from the dependent claims, the description and the drawings. Preferred embodiments of the measuring system will be explained in detail hereinafter with reference to the accompanying drawings, in which:

FIG. 7 shows a perspective sectional illustration of parts of the measuring system from FIG. 6, in particular of a stationary assembly of the measuring system.

DETAILED DESCRIPTION

Figure 1:
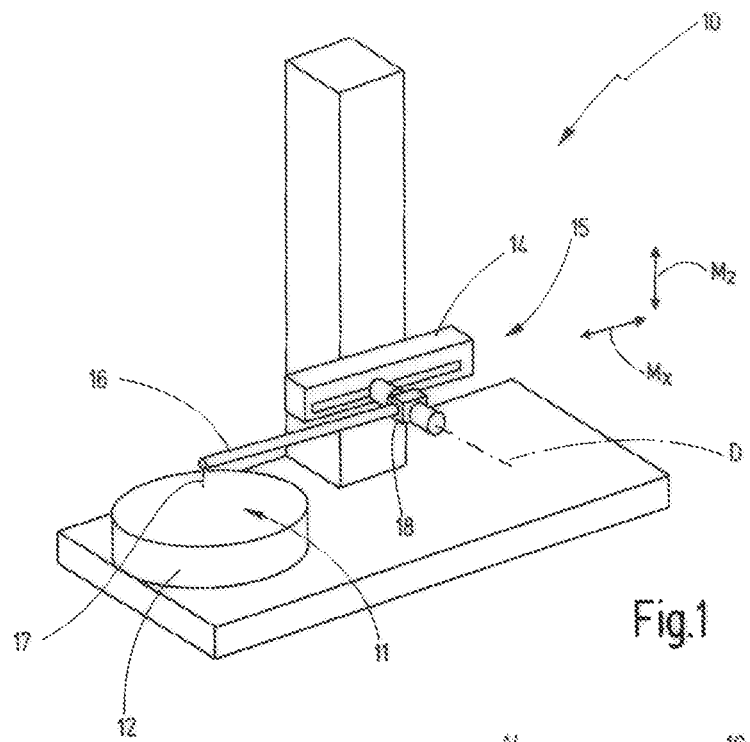
FIG. 1 shows a schematic perspective view of a measuring instrument comprising a measuring system according to the invention, wherein a measuring arm is in an approximately horizontal position.
Figure 2:
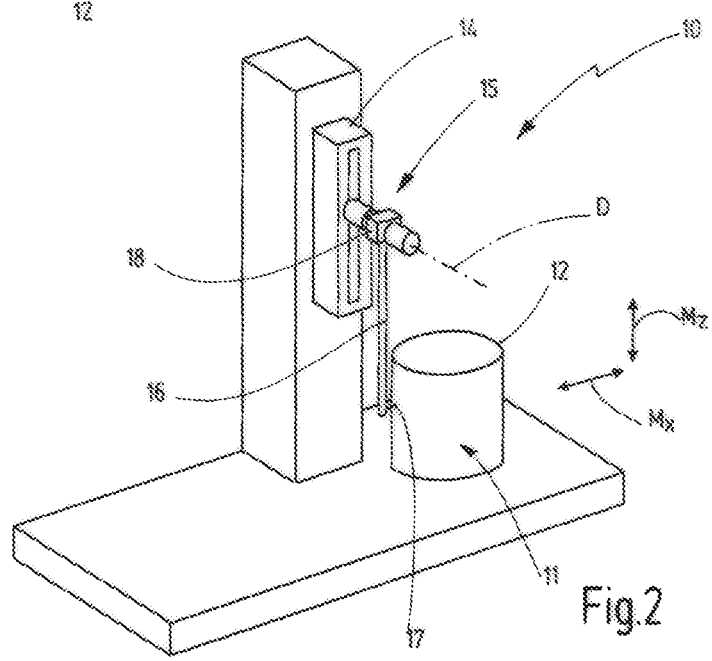
FIG. 2 shows the measuring instrument comprising the measuring system from FIG. 1, wherein the measuring arm is in an approximately vertical position.

FIGS. 1 and 2 show a measuring instrument 10, which for example can be used to measure the surface roughness on a surface 11 of a workpiece or object 12. Geometries or dimensional deviations of the object 12 can also be measured using a measuring instrument 10 of this kind.

The measuring instrument 10 comprises a feed axis 14 and a measuring system 15 comprising a measuring arm 16. The measuring arm 16 has a free end, at which it carries a measuring element 17, for example a probe element for measuring the object 12 in a tactile or contact-based manner. At the end opposite the measuring element 17, the measuring arm 16 is received or held in a measuring arm receiving unit 18 of the measuring system 15. The measuring arm receiving unit 18 is mounted rotatably about an axis of rotation D. A measuring arm 16 held in the measuring arm receiving unit 18 can thus be pivoted about the axis of rotation D.

By means of the feed axis 14, the measuring system 15 with a measuring arm 16 arranged thereon can be moved during the measurement in a measuring direction, for example in a horizontal measuring direction Mx or a vertical measuring direction Mz. If the measuring element 17 is in contact with the object 12 and is moved in the measuring direction along the surface 11 of the object 12, the measuring arm 16 is deflected via the measuring element 17 depending on the shape, geometry or roughness of the surface 11. The measuring system 15 can detect the pivot position of the measuring arm 16 or of the measuring arm receiving unit 18. In addition, the position of the measuring element 17 in the measuring direction Mx, Mz can be determined via the position of the feed axis 14. The measurement value pairs describing the pivot position and the associated position of the measuring element 17 and the measuring direction can be used to determine the roughness of the surface 11 or the shape or geometry of the object 12.

In the exemplary embodiment of the measuring instrument 10 depicted merely schematically in FIGS. 1 and 2, the feed axis 14 is pivotable. The feed axis 14 is formed as a linear axis of high accuracy. It can thus be oriented in the desired measuring direction Mx, Mz, wherein measuring directions inclined at any angle relative to the horizontal and/or vertical also can be set. During the measurement, it is therefore sufficient to move the measuring arm 16 merely by means of the feed axis 14. In a variant, the measuring system 15 with the measuring arm 16 could also be moved simultaneously in the desired measuring direction by different and/or a plurality of machine axes, depending on the desired measuring direction Mx, Mz, if the machine axes can be controlled sufficiently precisely for this purpose.

Figure 3:
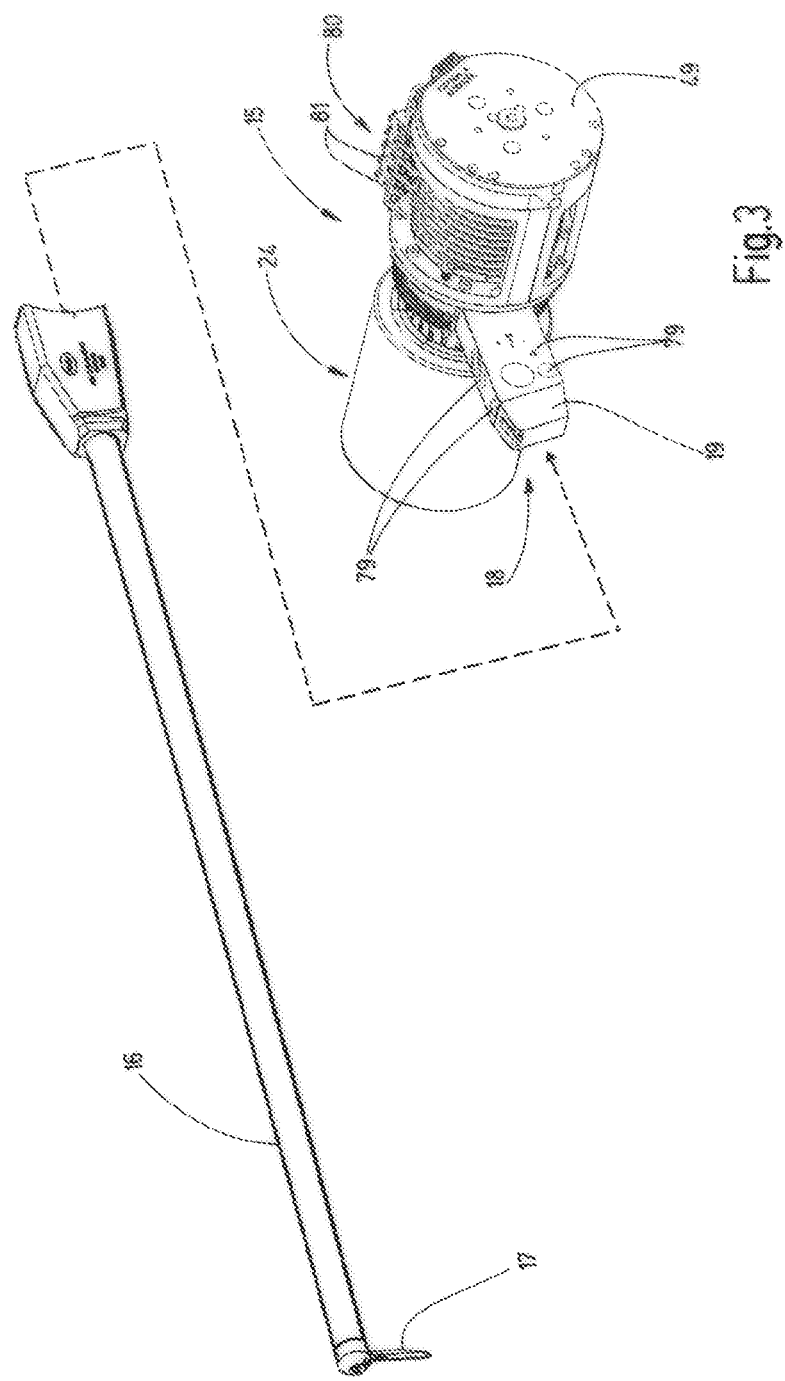
FIG. 3 shows a schematic perspective depiction of an exemplary embodiment of a measuring system according to the invention comprising a measuring arm that can be attached thereto.

The measuring arm receiving unit 18 can comprise a mechanical and/or electrical interface for attachment of the measuring arm 16 (FIG. 3). The mechanical and/or electrical fastening means for the measuring arm 16 can be arranged on a receiving body 19 of the measuring arm receiving unit 18, which receiving body protrudes radially away from the axis of rotation D. The receiving body 19 is mounted rotatably about the axis of rotation D. It is for this purpose connected to a rotary part 20 or formed integrally with a rotary part 20. The rotary part 20 is illustrated in FIGS. 4, 6, 8 and 9 and is part of the measuring arm receiving unit 18. The rotary part 20 is arranged coaxially with the axis of rotation D in accordance with the example.

Figure 6:
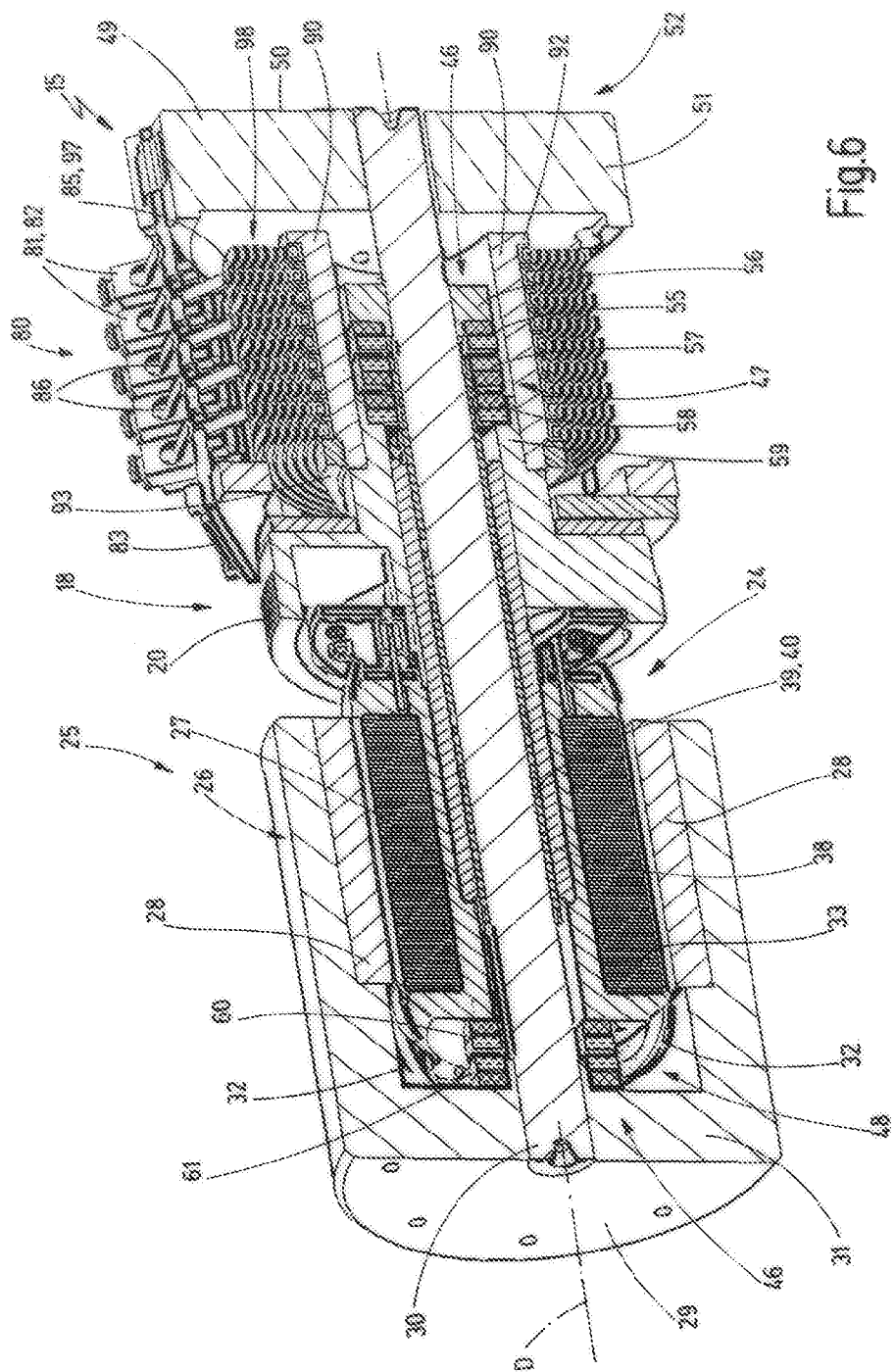
FIG. 6 shows a perspective sectional illustration along an axis of rotation of an exemplary embodiment of a measuring system according to the invention.
Figure 7:
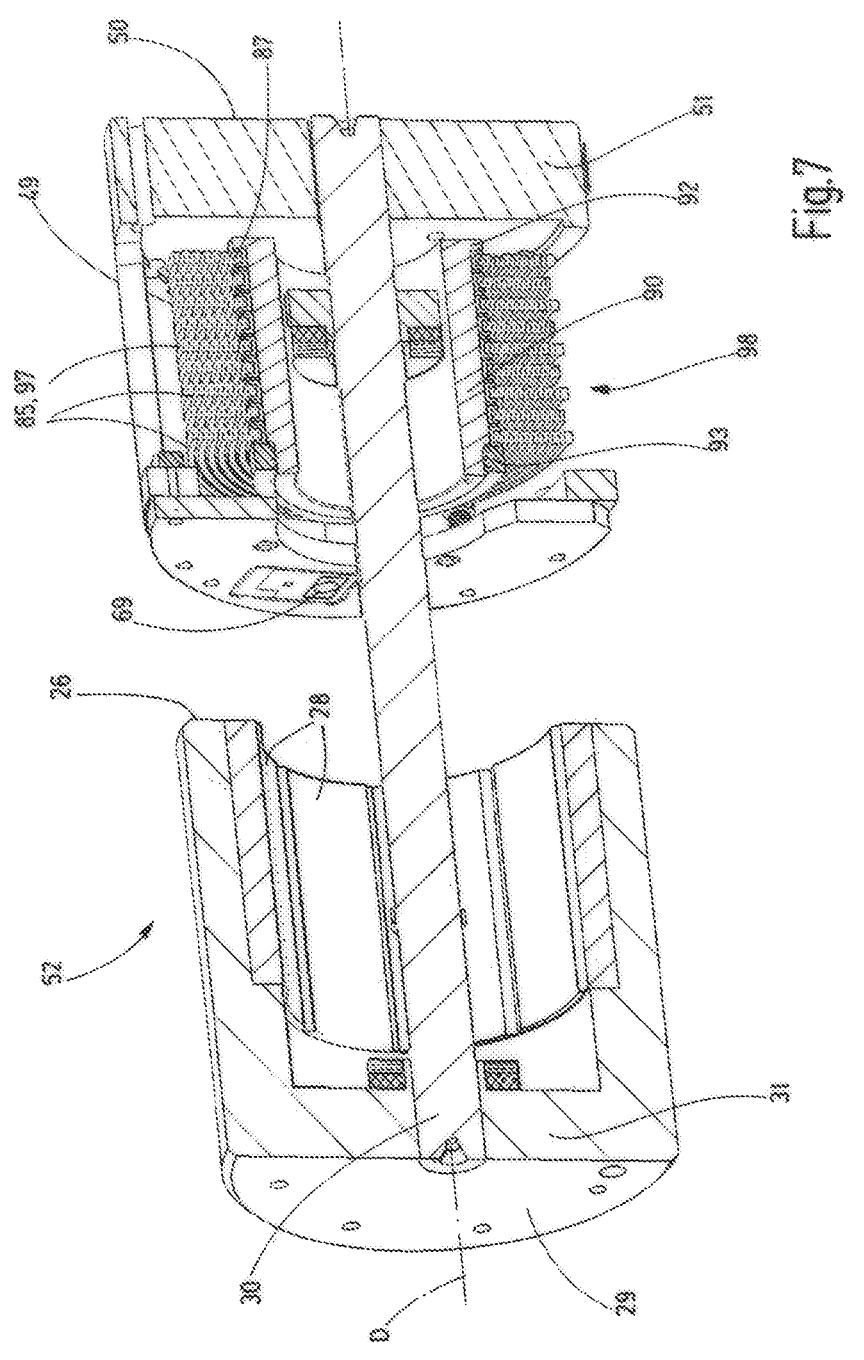

The measuring system 15 comprises a motor unit 24 with an electric motor 25. The electric motor 25 is preferably embodied as a brushless electric motor. It has a stator 26 and a rotor 27. In accordance with the example, the electric motor 25 is permanently excited. To this end, permanent magnets 28 are arranged on the stator 26 in a manner distributed about the axis of rotation D in a peripheral direction U. In one exemplary embodiment, the stator 26 is pot-shaped or cup-shaped and the permanent magnets 26 are arranged on the inner peripheral surface of the stator (FIGS. 6 and 7). The stator 26 is connected at an outer end 29 to an axial pin 30 for conjoint rotation in an axial direction A oriented parallel to the axis of rotation D. The axial pin 30 extends along the axis of rotation D, such that the longitudinal axis of the axial pin 30 defines the axis of rotation D. In the exemplary embodiments presented here, the stator 26, at its outer end 29, comprises a wall portion 31, which extends radially to the axis of rotation D and is connected to the axial pin 30 for conjoint rotation by means of a frictionally engaged and/or positively engaged and/or preferably an integrally bonded connection.

Figure 8:
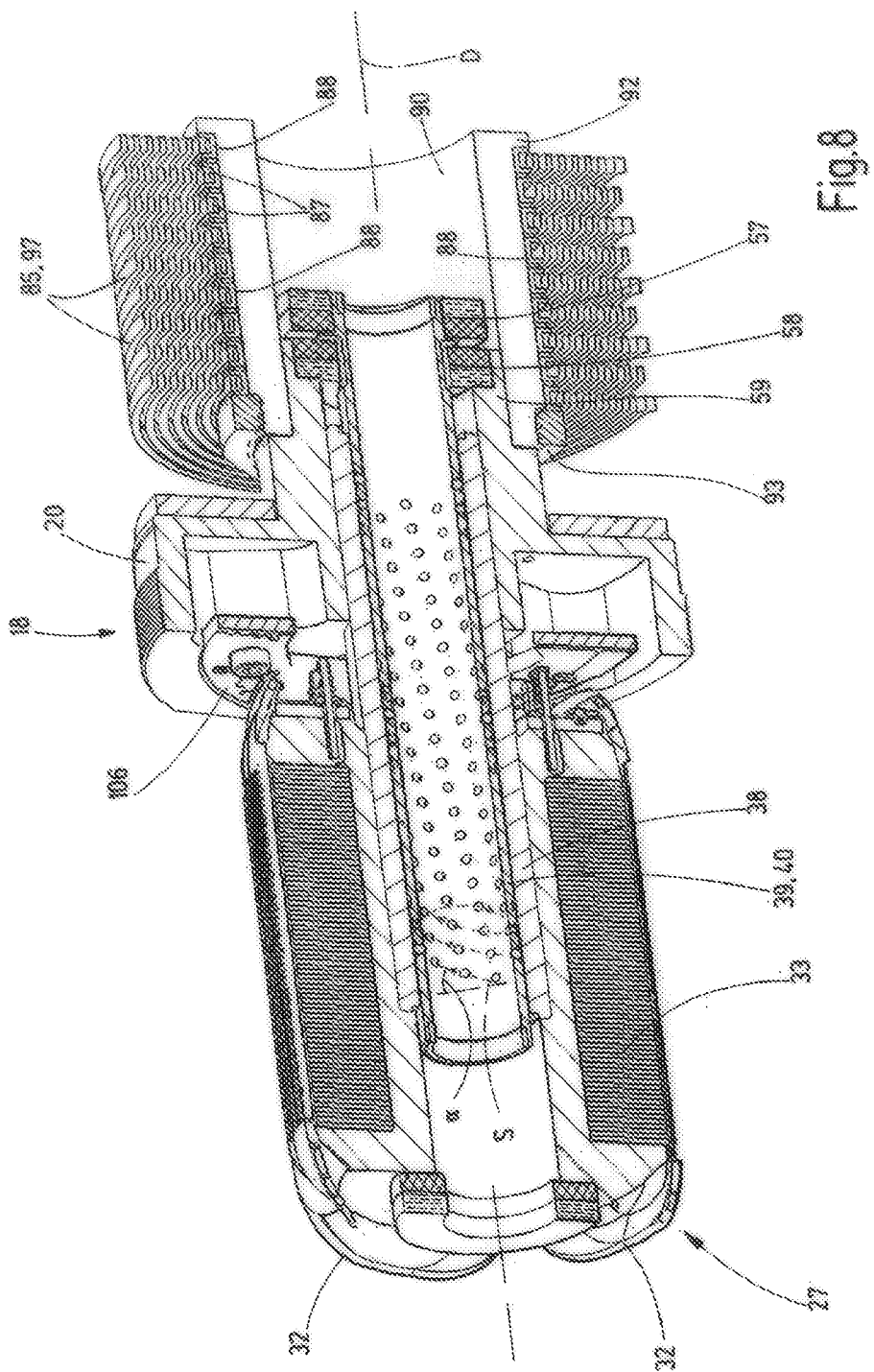
FIG. 8 shows a perspective sectional illustration of the measuring system of parts of the measuring system from FIG. 6 without the stationary assembly from FIG. 7.
Figure 9:
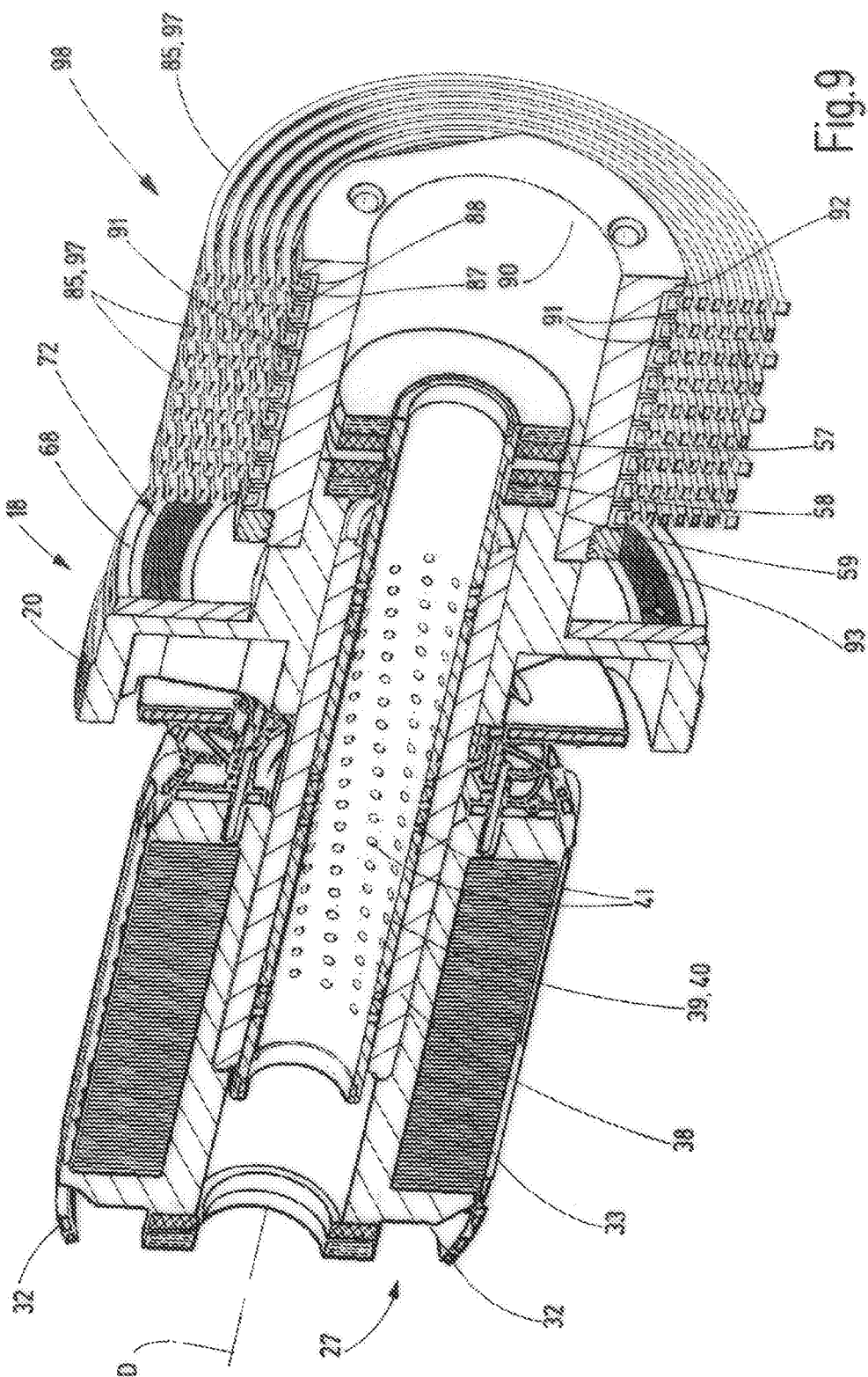
FIG. 9 shows the parts of the measuring system from FIG. 8 in another perspective sectional illustration.

The rotor 27 of the electric motor 25 comprises a plurality of rotor windings 32, and in the preferred exemplary embodiment three rotor windings 32, two of which rotor windings 32 can be seen in FIGS. 6, 8 and 9. The rotor windings 32 are arranged externally around a laminated core 33 of the rotor 27.

The rotary part 20 of the measuring arm receiving unit 18 is connected to the rotor 27 for conjoint rotation. The connection for conjoint rotation is achieved in the exemplary embodiment in that both the rotor 27 and the rotary part 20 are arranged on a common carrier sleeve 38 for conjoint rotation. In order to mount the rotor 27 and the rotary part 20 rotatably, the common carrier sleeve 38 is mounted, in accordance with the example, rotatably about the axis of rotation D in the peripheral direction U and displaceably along the axis of rotation D in the axial direction A. To this end, a ball bearing guide unit 39 is provided in accordance with the example. The ball bearing guide unit 39 allows a rotation of the carrier sleeve 38 in the peripheral direction U and a displacement in the axial direction A relative to the axial pin 30.

Figure 11:
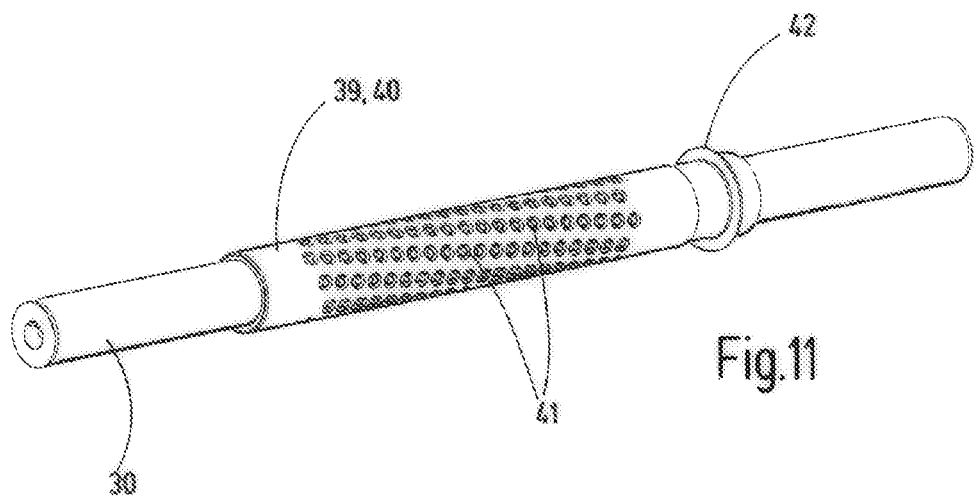
FIG. 11 shows a perspective illustration of a roller guide of the measuring system according to FIGS. 6 to 9.

The ball bearing guide unit 39 in accordance with the example comprises a ball bearing guide sleeve 40, which comprises a plurality of balls 41 (FIG. 11). In the case of the exemplary embodiment, the ball bearing guide unit 39, besides the ball bearing guide sleeve 40 with the balls 41, also includes the axial pin 30 and the carrier sleeve 38. The balls 41 are each arranged in a ball seat in the ball bearing guide sleeve 40 so as to be rotatable in all directions about the ball centre point. The ball bearing guide sleeve 40 can therefore also be referred to as a ball bearing cage. It can be seen in particular from FIGS. 8, 9 and 11 that the balls 41 are arranged about the axis of rotation D along a helical path S. The helical path S is shown schematically in a dashed manner in FIG. 8. The helical path S can also be referred to as a helix. The helical path S has a lead angle α. In a variant compared to the depicted exemplary embodiment, it is also possible to arrange the balls 41 along a plurality of helical paths S arranged offset from one another in the peripheral direction U. At one axial end, the ball bearing guide sleeve 40 comprises a ring flange 42, which is arranged substantially in a radial plane radially to the axis of rotation D.

An axial movement of the rotatably mounted parts along the axial pin 30 is not desirable. In order to provide axial support without friction and with sufficient rigidity, the measuring system 15 comprises a magnetic axial bearing device 46, by means of which the axial position of the measuring arm receiving unit 18 and of the rotor 27 connected thereto for conjoint rotation can be defined. In the exemplary embodiment the axial position of the ball bearing guide sleeve 40 is also defined by means of the magnetic axial bearing device 46.

The magnetic axial bearing device 46 (FIG. 6) in accordance with the example has a first axial magnetic bearing 47 and a second axial magnetic bearing 48. The two axial magnetic bearings 47, 48 are arranged at a distance from one another in the axial direction A. The first axial magnetic bearing 47 is configured to generate a first magnetic force F1, which acts in the axial direction A between the measuring arm receiving unit 18 and, in accordance with the example, the rotary part 20 and a stationary assembly 52. The stationary assembly 52 includes the axial pin 30 and all constituents of the measuring system 15 indirectly or directly connected to the axial pin 30 for conjoint rotation or fixedly connected thereto.

In accordance with the example a housing 49 is provided which is connected to the axial pin 30 for conjoint rotation. It has a hollow-cylindrical design and in accordance with the example is formed in the manner of a cage, not entirely free of through-apertures. At the outer end 50 axially opposite the motor unit 24, the housing 49 in the exemplary embodiment has a wall portion 51, which extends substantially radially to the axis of rotation D and by means of which the housing is connected to the axial pin 30 for conjoint rotation.

The housing 49 and the stator 26 are therefore constituents of the stationary assembly 52.

The first magnetic force F1 forces the rotary part 20 away from the outer end 50 of the housing 49 and towards the stator 26. The second axial magnetic bearing 48 generates a second magnetic force F2 between the rotary part 20 of the measuring arm receiving unit 18 and the stationary assembly 52, in accordance with the example the stator 26. The second magnetic force F2 forces the rotary part 20, and in accordance with the example the rotatably mounted assembly formed of the rotary part 20, the carrier sleeve 38 and the rotor 27, away from the stator 26 towards the outer end 50 of the housing 49. The magnetic forces F1, F2 are shown schematically in FIG. 4. The stator 26 and the housing 49 are coupled by means of the axial pin 30 so as to be immovable relative to one another in the axial direction A and coupled for conjoint rotation in the peripheral direction U. The first magnetic force F1 and the second magnetic force F2 are directed towards one another from opposite directions and are of equal magnitude. The rotatably mounted assembly formed of the rotor 27, the rotary part 20 of the measuring arm receiving unit 18, and carrier sleeve 38 is axially biased and positioned by the oppositely directed magnetic forces F1, F2. The different arrow lengths in FIG. 4 do not represent the magnitudes, and instead are intended to illustrate the points at which the magnetic forces are supported.

The axial position of the ball bearing guide sleeve 40 is additionally predefined by means of one of the two axial magnetic bearings and in accordance with the example by means of the first axial magnetic bearing 47. To this end, a third magnetic force F3 acting in the axial direction is generated by the first axial magnetic bearing 47 and acts between the stationary assembly 52—in accordance with the example the housing 49—and the ball bearing guide sleeve 40. In accordance with the example the third magnetic force F3 forces the ball bearing guide sleeve 40 away from the outer end 50 of the housing 49 in the direction of the stator 26. The first axial magnetic bearing 47 additionally generates a fourth magnetic force F4. The third magnetic force F3 and the fourth magnetic force F4 are directed oppositely to one another. They are of equal magnitude and define the axial position of the ball bearing guide sleeve 40 along the axial pin 30. In the exemplary embodiment the fourth magnetic force F4 acts between the rotary part 20 of the measuring arm receiving unit 18 and the ball bearing guide sleeve 40 and forces the ball bearing guide sleeve 40 away from the rotary part 20 in the direction of the outer end 50 of the housing 49. The rotary part 20 supports the fourth magnetic force F4 in turn by means of the second axial magnetic bearing 48 on the stationary assembly 52.

The arrangement of the two axial magnetic bearings 47, 48 can be seen in particular from FIG. 6. Each axial magnetic bearing 47, 48 has a plurality of ring magnets, which are arranged coaxially with the axis of rotation D and are magnetised in the axial direction A. This means that the north pole and the south pole of a ring magnet are arranged adjacently in the axial direction. In FIGS. 6 to 9 the north poles of the ring magnets are shown schematically by areas filled with dashed parallel lines, and the south poles of the ring magnets are shown schematically by a diamond-shaped hatching. All ring magnets of the axial magnetic bearings 47, 48 are permanently magnetic in accordance with the example.

As can be seen in FIG. 6, the first axial magnetic bearing 47 comprises three ring magnets arranged adjacently in the axial direction A. A first ring magnet 55 sits on a supporting ring 56, which is mounted on the axial pin 30 for conjoint rotation and in an axially non-displaceable manner. In other exemplary embodiments the supporting ring 56 could also be directly connected to the housing 49, for example to the wall portion 51. The supporting ring 56 is therefore part of the stationary assembly 52 and/or the housing 49.

Directly next to the first ring magnet 55, there is arranged a second ring magnet 57 of the first axial magnetic bearing 47. The second ring magnet 57 is fastened on the ball bearing guide sleeve 40, for example to the ring flange 42, and can be moved jointly with the ball bearing guide sleeve 40 relative to the axial pin 30. The north pole of the second ring magnet 57 is arranged here directly adjacently to the north pole of the first ring magnet 55, such that the first ring magnet 55 and the second ring magnet 57 repel one another in order to generate the third magnetic force F3.

The first axial magnetic bearing 47 additionally comprises a third ring magnet 58. The third ring magnet 58 surrounds the ball bearing guide sleeve 40 with play in accordance with the example. In its radially outer region it is fixedly connected to the rotary part 20 of the measuring arm receiving unit 18. In accordance with the example, the rotary part 20 has an axial extension 59, which protrudes axially beyond the carrier sleeve 38 and to which the third ring magnet 58 is fastened. The carrier sleeve 38 in the exemplary embodiment is arranged at an axial distance from the third ring magnet 58. All ring magnets 55, 57, 58 of the first axial magnetic bearing 47 are arranged coaxially with the axis of rotation D.

The first magnetic force F1 is achieved in this exemplary embodiment of the first axial magnetic bearing 47 in that a third ring magnet 58 is supported indirectly on the first ring magnet 55 by means of the second ring magnet 57. As a result of this stacked arrangement, the number of the ring magnets of the first axial magnetic bearing 47 can be minimised. In a modified exemplary embodiment, the first magnetic force F1 could also be generated directly between the first ring magnet 55 and the third ring magnet 58 if these are arranged with identical poles adjacently to one another.

In the case of the exemplary embodiment illustrated here, all three ring magnets 55, 57, 58 of the first axial magnetic bearing 47 have the same radial dimensions and are preferably formed identically. The second ring magnet 57 arranged in the middle is arranged with exactly the reverse magnetic polarisation compared to the other two ring magnets 55, 58 in order to achieve the desired repulsion.

The second axial magnetic bearing 48 comprises a fourth ring magnet 60 and a fifth ring magnet 61. In accordance with the example, the fourth ring magnet 60 and the fifth ring magnet 61 have the same radial dimensions and/or the same radial dimensions as the ring magnets 55, 57, 58 of the first axial magnetic bearing 47 and can be constructed identically to the ring magnets 55, 57, 58 of the first axial magnetic bearing 47. The fourth ring magnet 60 and the fifth ring magnet 61 surround the axis of rotation D coaxially. The fourth ring magnet 60 is arranged fixedly on the rotor 27. The fifth ring magnet 61 is arranged fixedly on the stator 26 and in accordance with the example is arranged on the wall portion 31. The fourth ring magnet 60 and the fifth ring magnets 61 are arranged adjacently to one another, wherein identical magnetic poles are arranged directly adjacently, such that the two ring magnets 60, 61 repel one another. An axial magnetic force is thus generated between the stator 26 and the rotor 27, and forms the second magnetic force F2. In accordance with the example the two north poles are arranged directly adjacently to one another.

As explained above, in the exemplary embodiment all ring magnets 55, 57, 58, 60, 61 have the same radial dimensions. The magnetic forces generated by these ring magnets are therefore arranged at the same distance from the axis of rotation D, such that no torques are created at right angles to the axis of rotation D.

Since the balls 41 of the ball bearing guide sleeve 40 are arranged over a spiral path S about the axis of rotation D, the ball bearing guide sleeve 40, with rotation about the axial pin 30, tends to move only to one side in the axial direction A along the axial pin 30 in accordance with the pitch of the spiral path S. The movement is prevented by the magnetic axial bearing device 46. By means of the arrangement of the balls 41 along a spiral path S, very small micro movements of the ball bearing guide sleeve 40, which cannot be supported by the magnetic axial bearing device 46 alone, can be avoided along the axial pin 30. The positioning of the ball bearing guide sleeve 40, and consequently also of the measuring arm guide unit 18 mounted thereon, in the axial direction A can thus be further improved.

The measuring system 15, for detecting the rotary position of the measuring arm receiving unit 18 or the receiving body 19 about the axis of rotation D, comprises a measuring device 67. The measuring device 67 is shown in a heavily schematic manner in FIG. 4. Constituents of the measuring device 67 are also visible in FIGS. 7 and 9. A scale part 68 and a detection unit 69 belong to the measuring device 67. The detection unit 69 works together with the scale part 68, in accordance with the example contactlessly, in order to detect the rotary position. To this end, the detection device 69 in accordance with the example comprises a transmitter 70 and a receiver 71. The transmitter 70 is embodied in accordance with the example as a light transmitter, and the receiver 71 is embodied in accordance with the example as a light receiver. The transmitter 70 and the receiver 71 can be arranged on the same side or on opposite sides with respect to the scale part 68. In accordance with the example the transmitter 70 and the receiver 71 are arranged adjacently on the same side and are fastened to the housing 49.

The scale part 68 is connected to the stationary assembly 52, and in accordance with the example to the measuring arm receiving unit, for conjoint rotation. The scale part 68 is embodied in the exemplary embodiment as a ring disc that is fully closed and the peripheral direction U (FIG. 9). It comprises light-reflecting and non-light-reflecting elements in alternation in an annular scale region. Whereas the reflecting regions reflect the light emitted by the transmitter 70, the light is absorbed at least in part by the non-reflecting elements. The different intensities of the reflected light are detected by the receiver 71. A relative movement can thus be identified. With the aid of the detection unit 69, a change to the rotary angle position of the measuring arm receiving unit 18 about the axial pin 30 and thus about the axis of rotation D can therefore be detected. The rotary angle value detected in this way correlates with the variable that is to be measured, for example a measurement value that can be used to determine the roughness of a surface 11 of an object 12 or the shape or geometry thereof.

The scale part 68 or scale region thereof, in a variant compared to the depicted exemplary embodiment, also might not be fully closed, and can be embodied in the form of a circular arc when the measurement range is limited accordingly to an angular range smaller than 360°. By means of the disc that is fully closed in accordance with the example with an annularly closed scale region, any arbitrary rotary angle position (0° to) 360° can be measured in principle using the measuring arm 16.

The motor unit 24 or the electric motor 25 is configured to generate a motor torque about the axis of rotation D onto the measuring arm receiving unit 18 and consequently onto a measuring arm 16 arranged thereon. During the measurement, a predefined measuring force with which the measuring element 17 bears against the surface 11 of the object 12 can thus be set and in particular controlled. A control unit (not shown) can predefine a motor control variable characteristic for the motor torque of the electric motor 25, moreover in a parameter-dependent manner, which motor control variable can be controlled by open-loop or closed-loop control at least in accordance with a characteristic curve stored in the control unit. A motor control variable can be the motor current, for example. The at least one characteristic curve can be dependent on at least one parameter, for example dependent on the used measuring arm 16, in particular the length thereof between the axis of rotation D and the measuring element 17 and/or weight thereof, on the current rotary angle position of the measuring arm 16, in particular relative to the horizontal or to the vertical, and other parameters. The control unit can thus control the desired measuring force. The at least one characteristic curve can be determined empirically for different measuring arms and/or in different measuring ranges (rotary angle ranges about the axis of rotation).

It is necessary in accordance with the example to establish an electrical connection between one or more rotatably mounted components and a stationary assembly 52. The electrical connection is illustrated schematically in particular in FIG. 4. A plurality of electrical winding terminals 76 are provided on the rotor 27 for electrical connection of the rotor windings 32. In the exemplary embodiment four electrical winding terminals are provided on the rotor 27. A winding terminal 76 is provided for each of, in accordance with the example, three rotor windings 32 and a further, common winding terminal 76, which is electrically connected to the star point 77, to which all rotor windings 32 are electrically connected. More or fewer electrical winding terminals 76 can also be provided on the rotor 27 depending on the number of rotor windings 32 and the electrical connection thereof.

Figure 5:
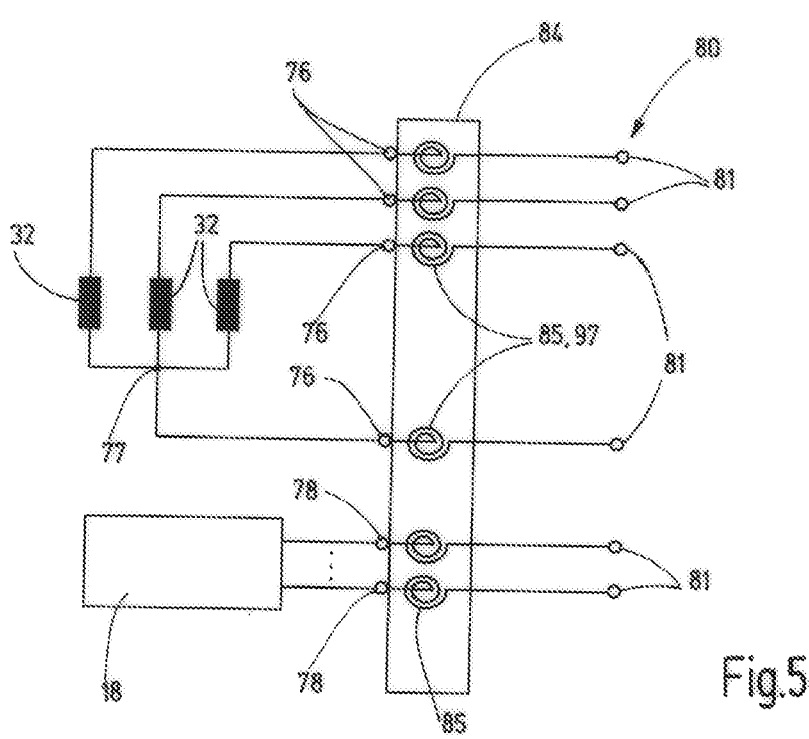
FIG. 5 shows a circuit diagram which schematically illustrates the electrical connection between an electrical terminal device on a stationary assembly and electrical terminals on components of the measuring system rotatable relative to the stationary assembly.

In accordance with the example, at least one electrical measuring arm terminal 78 is provided on the measuring arm receiving unit 18 and is electrically connected in each case to one or more electrical contact elements 79 on the receiving body 19. The at least one contact element 79 can be formed by a contact surface, a contact pin, a contact socket, or the like. It is configured, with a received measuring arm 16, to bring about an electrical connection to suitable corresponding electrical counter contacts on the measuring arm 16. Depending on the embodiment of the measuring arm receiving unit, one, two or also more contact elements 79 and/or measuring arm terminals 78 can be provided. Two measuring arm terminals 78 are illustrated in FIG. 5 merely by way of example.

Figure 4:
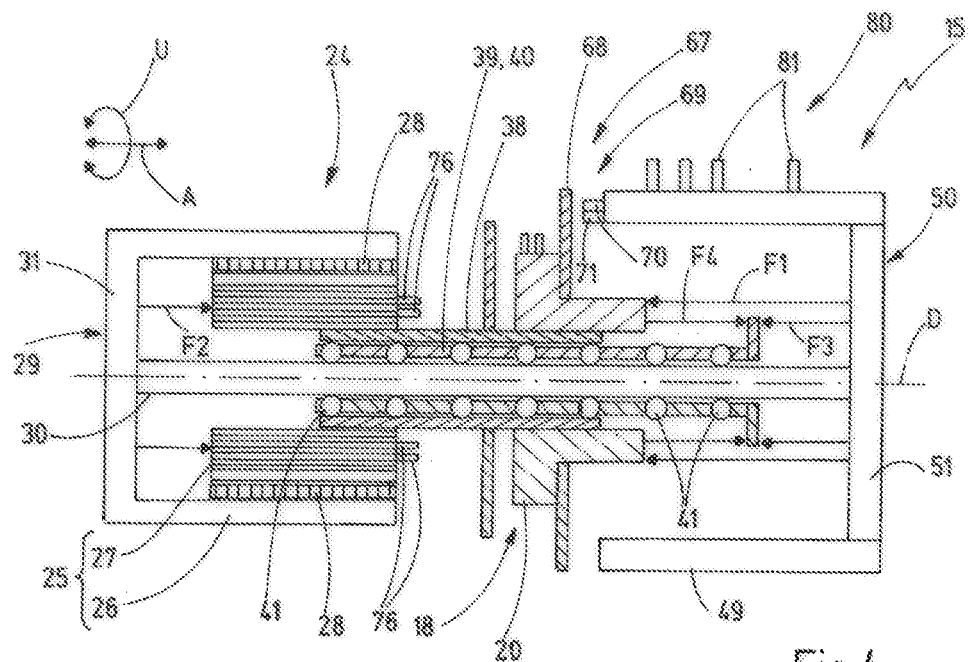
FIG. 4 shows a schematic, block-diagram-like, partly sectional depiction of an exemplary embodiment of a measuring system according to the invention.
Figure 13:
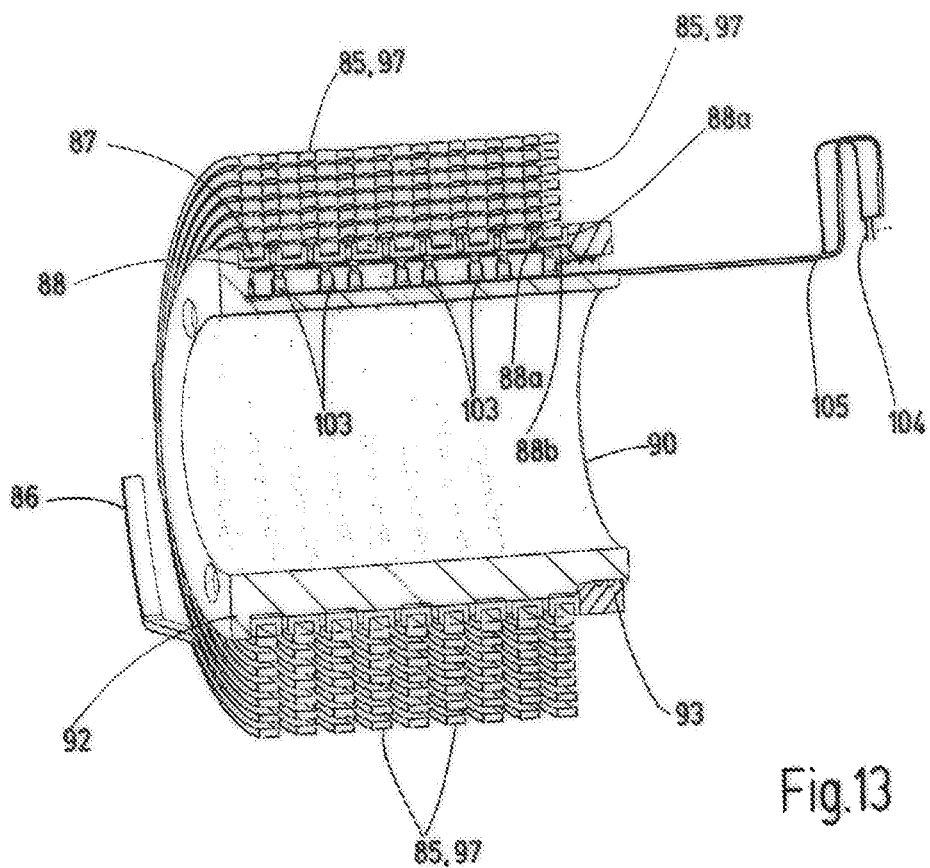
FIG. 13 shows a perspective, partly sectional depiction of the electrical contact of the spiral conductors or the spiral springs at their radially inner end.
Figure 14:
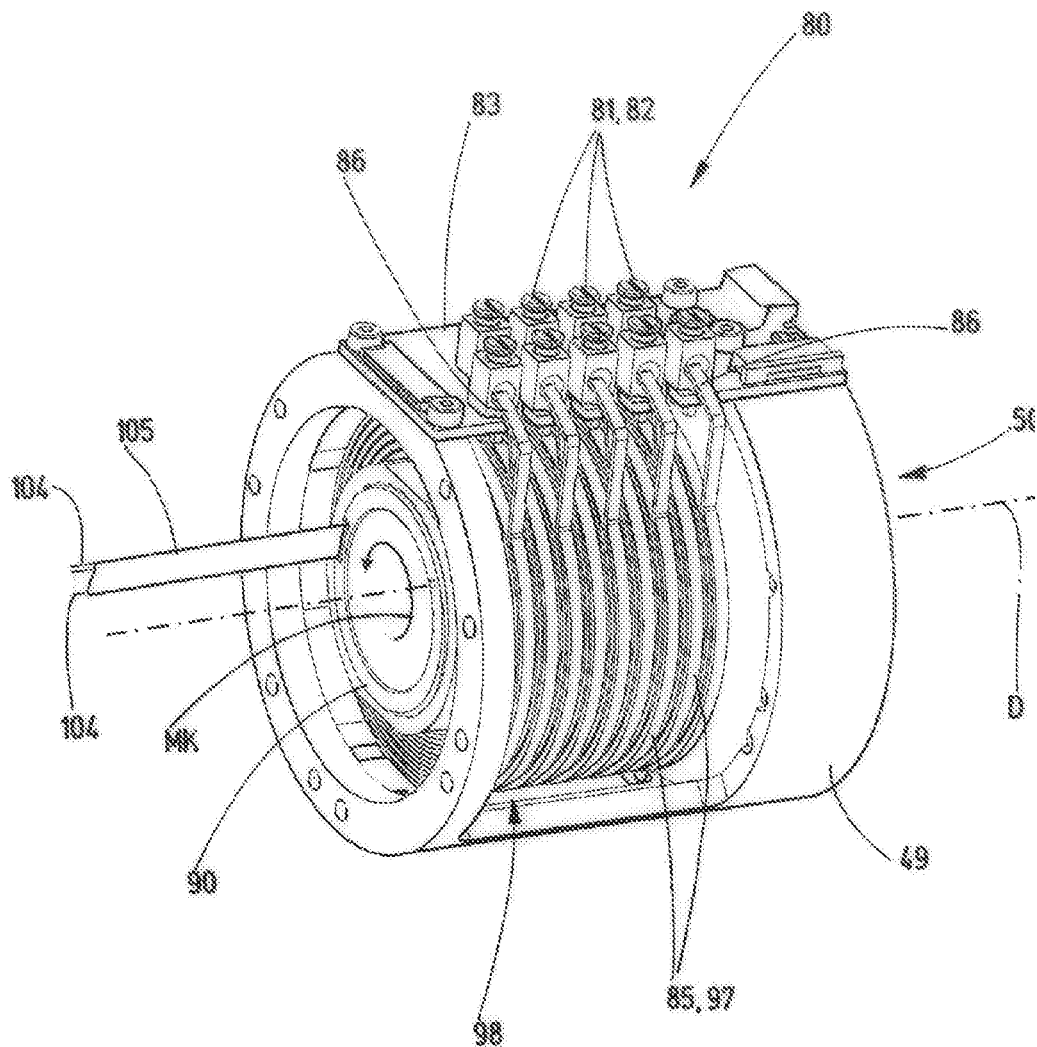
FIG. 14 shows a perspective illustration of a housing of the stationary assembly of the measuring system according to FIGS. 6 to 11.

Both the winding terminals at 76 and the measuring arm terminals 78 are mounted rotatably about the axis of rotation D. An electrical terminal device 80 arranged in a rotationally fixed manner relative to the axis of rotation D or the axial pin 30 is provided on the housing 49 or another part of the stationary assembly 52 (FIGS. 3, 4 and 14). The electrical terminal device 80, depending on the number of the provided winding terminals 76 and measuring arm terminals 78, has a corresponding number of electrical terminals 81. For example, nine electrical terminals 81 in the form of terminal clamps 82 are shown in FIG. 13. The electrical terminals 81 of the terminal device 80 are fastened on an electrically insulated plate in the exemplary embodiment, which plate is connected here fixedly to the housing 49.

An electrical connection device 82 is provided, which provides an electrical connection between the electrical terminals 81 of the terminal device 80 and the provided winding terminals 76 and/or measuring arm terminals 78, without significantly limiting the rotatability of the measuring arm receiving unit 18 or of the rotor 27 about the axial pin 30.

For example, the electrical connection device 84 could comprise sliding contacts, such as brushes or the like, or also rolling elements, such as balls or rollers, which are electrically conductive and slide or roll over electrically conductive tracks arranged concentrically with the axis of rotation D. The tracks can be electrically connected to the winding terminals 76 and/or measuring arm terminals 78, for example by corresponding lines or cables.

In the case of the exemplary embodiment, the electronic connection device 84 comprises one or more electrical spiral conductors 85. Each spiral conductor 85 is wound in a spiral manner radially inwardly from an outer end 86 in the direction of the axis of rotation D, wherein the radius of the turns decreases radially inwardly. The spiral conductor 85 extends substantially in a radial plane relative to the axis of rotation D. The radially innermost turn 87, which comprises or forms the radially inner end of the spiral conductor 85, is received in a fastening ring 88. The fastening ring 88 has a radially outwardly open groove or channel. The channel is delimited in the axial direction A by second side walls 88a of the fastening ring 88, which are connected to one another radially inwardly by an annular base 88b of the fastening ring 88. The fastening ring 88 thus has a U-shaped cross-section. The radially innermost turn 87 can be fixed in the fastening ring 88 in a frictionally engaged, integrally bonded or positively engaged manner, or by a combination of these fastening types. In the exemplary embodiment the side walls 88a of the fastening ring 88 are reshaped at least at some points and exert a clamping force onto the radially innermost turn 87 at these points and/or form a positively engaged connection to the radially innermost turn 87 at these reshaped points.

The spiral conductor 85 and the fastening ring 88 are made of electrically conductive material and are likewise electrically connected to one another by the establishment of the mechanical connection. The outer end 86 of the spiral conductor is electrically connected to the associated terminal 81 of the electrical terminal device 80, as is shown in particular in FIG. 14.

The fastening ring 88 and in particular the annular base 88b thereof is formed at one or at a plurality of peripheral points with an unround region 89 on the radially inwardly facing underside thereof. The unround region 89 is to be understood to mean a peripheral point that does not lie on a common cylinder lateral surface with the rest of the radially inner underside of the fastening ring 88, but outside thereof. In the case of the exemplary embodiment presented here, the unround region 89 is embodied by a flattened portion, which extends into a cylinder having a cylinder lateral surface, wherein the underside of the fastening ring 88 lies outside the unround region 89 on this cylinder lateral surface.

The fastening rings 88 for the spiral conductors 86 are arranged on an outer lateral surface on a body arranged coaxially with the axis of rotation D and in accordance with the example a sleeve-like carrier 90. This outer lateral surface has a cross-sectional contour adapted to the radially inner underside of the fastening rings 88. It comprises a peripheral region corresponding to the unround region 89—in the exemplary embodiment a flattened portion. The fastening rings 88 are thus prevented from rotating about the axis of rotation D relative to the sleeve-like carrier 90. Instead of the flattened portions, other anti-twist means could also be provided, for example an axial groove in the lateral surface of the sleeve-like carrier 90 and a corresponding protrusion on the radial inner underside of each fastening ring 88, which protrusion engages in the axial groove. The fastening ring 88 could also be connected to the sleeve-like carrier 90 by an integrally bonded connection, such as gluing, welding or the like.

The sleeve-like carrier 90 in the exemplary embodiment consists of electrically insulating material. An insulation ring 98 made of electrically insulating material is arranged in each case between two directly adjacent fastening rings 88. The fastening rings 88 with the insulation rings 91 arranged therebetween are secured, and in accordance with the example clamped, in the axial direction A between an end-face flange 92 of the sleeve-like carrier 90 and a securing ring 93. For example, the securing ring 93 can be screwed onto the sleeve-like carrier 90 at the axial end opposite the flange 92.

The sleeve-like carrier 90 is connected to the rotary part 20, and in accordance with the example the axial extension 59, for conjoint rotation. It therefore rotates jointly with the rotary part 20 of the measuring arm receiving unit 18 or the rotor 27 about the axis of rotation D relative to the housing 49. Depending on the sense of rotation, the spiral conductor 85 wound in a spiral manner can be wound or unwound, wherein its individual turns are moved closer to one another or further away from one another.

Figure 10:
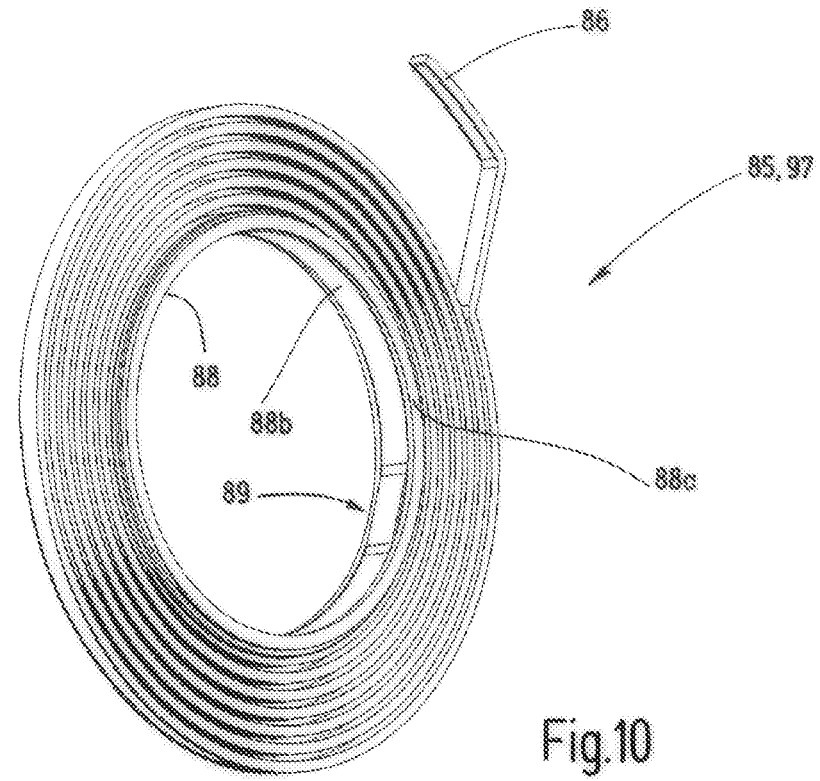
FIG. 10 shows a perspective view of a spiral spring with a fastening ring of the measuring system according to FIGS. 6 to 9 in a perspective illustration.

As is clear from the drawings and in particular FIG. 10, the spiral conductor 85 in the exemplary embodiment described here is formed by a spiral spring 97. The spiral spring 97 can generate a torque between the sleeve-like carrier 90 and the housing 49, which torque for example serves as a compensation torque (FIG. 14) for at least partial compensation of the torque exerted by the weight force of the measuring arm 16. The spiral springs 97 thus form a weight compensation device 98. The compensation torque MK can be set depending on the used measuring arm 16, in particular the length and weight thereof, such that, in order to apply the desired measuring force, the motor unit 24 or the electric motor 25 must generate rotor torques that are of the smallest magnitude possible. A spring characteristic curve of the spiral springs 97 depending on the rotary angle about the axis of rotation D has a sufficiently small gradient, such that a good compensation of the torque generated by the measuring arm 16 about the axis of rotation D is possible over a desired rotary angle measuring range.

The weight compensation device 98 has a setting device 99, which is configured to set the magnitude of the compensation torque MK. The setting device 99 is formed in accordance with the example such that the sleeve-like carrier 90 is rotated about the axis of rotation D relative to the housing 49 until the desired magnitude of the compensation torque MK is reached (FIG. 14). In this position a connection of the sleeve-like carrier 90 to the rotary part 20 of the measuring arm receiving unit 8 is produced, and this is then acted on by the desired compensation torque MK about the axis of rotation D.

Figure 12:
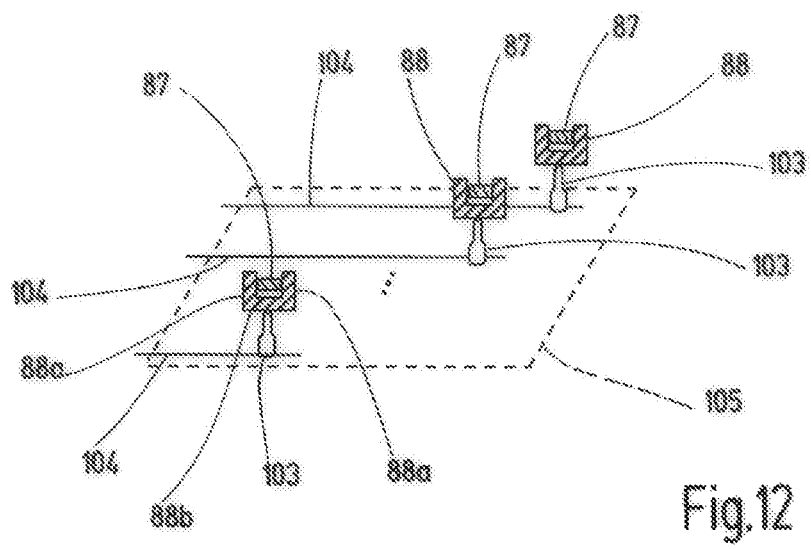
FIG. 12 shows a basic diagram of the electrical contact between the radially inner ends of the spiral conductor or the spiral springs.

In FIGS. 12 and 13 the electrical contact in the region of the sleeve-like carrier 90 is shown. Each electrically conductive fastening ring 88 bears against an electrically conductive contact pin 103. The contact pins 103 are arranged on the sleeve-like carrier 90 and protrude radially outwardly, away from the axis of rotation D, towards the corresponding associated fastening ring 88. Each contact pin 103 is additionally electrically connected to a conductor 104. The conductors 104 are conductors of a ribbon cable 105 in the exemplary embodiment. The ribbon cable 105 runs in an axial recess on the radially outer side of the sleeve-like carrier 90, as can be seen schematically in FIG. 13. The conductors 104 are electrically insulated by means of an insulation of the ribbon cable 105.

The ribbon cable 105 is guided to the rotary part 20 of the measuring arm receiving unit 18. In the region of the measuring arm receiving unit 18, the individual conductors 104 are electrically connected either to one of the measuring arm terminals 78 or to one of the winding terminals 76. It can be seen in FIGS. 6, 8 and 9 that an annular printed circuit board 106 is fastened to the rotary part 20. The annular printed circuit board 106 can carry electrical and/or electronic components. In addition, the electrical connections to the rotor windings 32 are produced there.

The measuring system 15 is thus able to enable a large and practically unlimited measuring range or rotary angle range of the measuring arm receiving unit 18 and a measuring arm 16 connected thereto, about the axis of rotation D. The motor unit 24 and the measuring device 67 work in a rotary manner and are arranged about the axis of rotation D and in particular coaxially with the axis of rotation D. Limitations of the possible deflection range of the measuring arm, as is the case in measuring systems having a two-arm rocker, do not exist in the embodiment according to the invention.

In addition, the measuring system 15 provides an advantageous mounting. A low-friction rotatability about the axial pin 30 is made possible by means of the ball bearing guide sleeve 40. The magnetic axial bearing device 46 supports the rotatably mounted constituents of the measuring system 15 in the axial direction A and defines the axial position thereof in a friction-free manner.

It should be noted that in the sectional illustrations of FIGS. 6-9 and 13, for reasons of clarity, not all cut faces have been hatched, in particular the cut faces of the spiral springs 97 and the fastening rings 88.

The invention relates to a measuring system 15 for a measuring instrument 10. A measuring arm receiving unit 18 is mounted on the housing 49 or on an axial pin 30 connected to the housing 49 for conjoint rotation so as to be rotatable or pivotable about the axis of rotation D. A measuring arm 16 can be arranged on the measuring arm receiving unit 18. A motor unit 24 with an electric motor 25 is used to generate a motor torque about the axis of rotation D on the measuring arm receiving unit 18. The motor unit 24 has a rotor 27 arranged coaxially with the axis of rotation D. A rotary angle specifying the rotary angle position of the measuring arm receiving unit 18 about the axis of rotation D is detected by means of a measuring device 67 having a scale part 68 and a detection unit 69. The scale part 68 is arranged in the form of a circular arc, annularly, or in the form of a disc about or coaxially with the axis of rotation D.

LIST OF REFERENCE SIGNS 10 measuring instrument
11 surface
12 object
14 feed axis
15 measuring system
16 measuring arm
17 measuring element
18 measuring arm receiving unit
19 receiving body
20 rotary part
24 motor unit
25 electric motor
26 stator
27 rotor
28 permanent magnet
29 outer end of the stator
30 axial pin
31 wall portion of the stator
32 rotor winding
33 laminated core
38 carrier sleeve
39 ball bearing guide unit
40 ball bearing guide sleeve
41 ball
42 ring flange
46 magnetic axial bearing device
47 first axial magnetic bearing
48 second axial magnetic bearing
49 housing
50 outer end of the housing
51 wall portion of the housing
55 first ring magnet
56 supporting ring
57 second ring magnet
58 third ring magnet
59 axial extension
60 fourth ring magnet
61 fifth ring magnet
67 measuring device
68 scale part
69 detection unit
70 transmitter
71 receiver
72 scale region
76 electrical winding terminal
77 star point
78 electrical measuring arm terminal
79 contact element
80 electrical terminal device
81 electrical terminal
82 terminal clamp
83 plate
84 electrical connection device
85 spiral conductor
86 outer end of the spiral conductor
87 radially innermost turn
88 fastening ring
88a side wall of the fastening ring
88b annular base of the fastening ring
89 unround region
90 sleeve-like carrier
91 insulation ring
92 flange of the sleeve-like carrier
93 securing ring
97 spiral spring
98 weight compensation device
99 setting device
103 contact pin
104 conductor
105 ribbon cable
106 printed circuit board
α lead angle
A axial direction
D axis of rotation
F1 first magnetic force
F2 second magnetic force
F3 third magnetic force
F4 fourth magnetic force
Mx horizontal measuring direction
Mz vertical measuring direction MK compensation torque
S helical path
U peripheral direction

The invention claimed is:

1. A measuring system (15) for a measuring instrument (10), the measuring system (15) comprising:
a stationary assembly (52),
a measuring arm receiving unit (18), which is mounted on the stationary assembly (52) rotatably about an axis of rotation (D) and which is configured to support a measuring arm (16),
a motor unit (24), which comprises a rotor (27), which is arranged coaxially with the axis of rotation (D) and which is connected to the measuring arm receiving unit (18) for conjoint rotation,
a measuring device (67), which comprises a scale part (68) and a detection unit (69) cooperating with the scale part (68) to detect a rotary position value, wherein the scale part (68) or the detection unit (69) is connected to the measuring arm receiving unit (18) and is arranged rotatably about the axis of rotation (D), jointly with the measuring arm receiving unit (18),
wherein the scale part (68) is arranged coaxially with the axis of rotation (D) and rotatably about the axis of rotation (D).

2. The measuring system according to claim 1, wherein the scale part (68) is arranged coaxially with the axis of rotation (D) and rotatably about the axis of rotation (D).

3. The measuring system according to claim 1, wherein the detection unit (69) is configured to contactlessly cooperate with the scale part (68) to detect the rotary position value.

4. The measuring system according to claim 3, wherein the detection unit (69) comprises a transmitter (70) and a receiver (71).

5. The measuring system according to claim 1, wherein the detection unit (69) is arranged immovably relative to the stationary assembly (52).

6. The measuring system according to claim 1, wherein the motor unit (24) comprises a stator (26), which surrounds the rotor (27) coaxially.

7. The measuring system according to claim 1, wherein the rotor (27) comprises a plurality of rotor windings (32), which are electrically connected to at least one electrical winding terminal (76), wherein the at least one winding terminal (76) is arranged rotatably about the axis of rotation (D).

8. The measuring system according to claim 1, wherein at least one electrical measuring arm terminal (78) is provided on the measuring arm receiving unit (18).

9. The measuring system according to claim 1, further comprising a weight compensation device (98) configured to exert a compensation torque (MK) about the axis of rotation (D) onto the measuring arm receiving unit (18).

10. The measuring system according to claim 9, wherein the weight compensation device (98) comprises at least one spiral spring (97), an inner end of which is connected to the measuring arm receiving unit (18) for conjoint rotation and an outer end (86) of which is connected to the stationary assembly (52).

11. The measuring system according to claim 1, wherein the stationary assembly (52) comprises an axial pin (30), which extends along the axis of rotation (D) and on which the measuring arm receiving unit (18) is beared by a ball bearing guide sleeve (40), wherein the measuring arm receiving unit (18) is mounted rotatably about the axial pin (30) and axially displaceably along the axial pin (30) by the ball bearing guide sleeve (40).

12. The measuring system according to claim 11, wherein the measuring arm receiving unit (18) and/or the rotor (27) and/or the ball bearing guide sleeve (40) is axially beared by a magnetic axial bearing device (46), which defines an axial position of the measuring arm receiving unit (18) and/or the rotor (27) and/or the ball bearing guide sleeve (40) along the axial pin (30).

13. A measuring system (15) for a measuring instrument (10), the measuring system (15) comprising:
a stationary assembly (52),
a measuring arm receiving unit (18), which is mounted on the stationary assembly (52) rotatably about an axis of rotation (D) and which is configured to support a measuring arm (16),
a motor unit (24), which comprises a rotor (27), which is arranged coaxially with the axis of rotation (D) and which is connected to the measuring arm receiving unit (18) for conjoint rotation,
a measuring device (67), which comprises a scale part (68) and a detection unit (69) cooperating with the scale part (68) to detect a rotary position value, wherein the scale part (68) or the detection unit (69) is connected to the measuring arm receiving unit (18) and is arranged rotatably about the axis of rotation (D), jointly with the measuring arm receiving unit (18),
wherein at least one electrical measuring arm terminal (78) is provided on the measuring arm receiving unit (18).

14. The measuring system according to claim 13, wherein the rotor (27) comprises a plurality of rotor windings (32), which are electrically connected to at least one electrical winding terminal (76), wherein the at least one winding terminal (76) is arranged rotatably about the axis of rotation (D).

15. The measuring system according to claim 14, wherein the at least one winding terminal (76) and/or the at least one measuring arm terminal (78) is connected by an electrical connection device (84) to an electrical terminal device arranged on the stationary assembly (52), wherein the electrical connection device (84) is configured to provide the electrical connection between the electrical connection device (84) and the at least one winding terminal (76) and/or the measuring arm terminal (78), which enables a relative rotation of the rotor (27) and of the measuring arm receiving unit (18) about the axis of rotation (D) relative to the stationary assembly (52).

16. The measuring system according to claim 15, wherein the electrical connection device (84) comprises at least one spiral conductor (85), wherein the at least one spiral conductor (85) electrically connects the electrical connection device (84) to the at least one winding terminal (76) and/or the measuring arm terminal (78).

17. A measuring system (15) for a measuring instrument (10), the measuring system (15) comprising:
a stationary assembly (52),
a measuring arm receiving unit (18), which is mounted on the stationary assembly (52) rotatably about an axis of rotation (D) and which is configured to support a measuring arm (16),
a motor unit (24), which comprises a rotor (27), which is arranged coaxially with the axis of rotation (D) and which is connected to the measuring arm receiving unit (18) for conjoint rotation,
a measuring device (67), which comprises a scale part (68) and a detection unit (69) cooperating with the scale part (68) to detect a rotary position value, wherein the scale part (68) or the detection unit (69) is connected to the measuring arm receiving unit (18) and is arranged rotatably about the axis of rotation (D), jointly with the measuring arm receiving unit (18), and a weight compensation device (98) configured to exert a compensation torque (MK) about the axis of rotation (D) onto the measuring arm receiving unit (18).

18. The measuring system according to claim 17, wherein the weight compensation device (98) comprises at least one spiral spring (97), an inner end of which is connected to the measuring arm receiving unit (18) for conjoint rotation and an outer end (86) of which is connected to the stationary assembly (52).

19. The measuring system according to claim 18 wherein at least one of the at least one spiral springs (97) of the weight compensation device (98) forms an electrical spiral conductor (85).

20. The measuring system according to claim 18, wherein the weight compensation device (98) comprises a setting device (99), which is configured to set the value of the compensation torque (MK).

\* \* \* \* \*